United States Patent [19]

Singer

[11] 3,924,471
[45] Dec. 9, 1975

[54] AUTOMATIC LIQUID SAMPLE TAKING AND SEGREGATING APPARATUS

[76] Inventor: Ernst Singer, 3491 Puget Drive, Vancouver, B. C., Canada

[22] Filed: Feb. 7, 1974

[21] Appl. No.: 440,294

[52] U.S. Cl. ............................... 73/421 B; 141/130
[51] Int. Cl.² ........................................... G01N 1/14
[58] Field of Search ........ 73/421 R, 421 B, 422 TC; 141/130

[56] References Cited
UNITED STATES PATENTS

| | | | |
|---|---|---|---|
| 2,604,248 | 7/1952 | Gorham | 141/130 |
| 2,665,585 | 1/1954 | Marcell et al. | 141/130 |
| 3,192,968 | 7/1965 | Baruch | 141/130 |
| 3,589,197 | 6/1971 | Brooks, Sr. | 73/421 R |

FOREIGN PATENTS OR APPLICATIONS

720,161  12/1954  United Kingdom ............... 73/421

Primary Examiner—S. Clement Swisher
Attorney, Agent, or Firm—Fetherstonhaugh & Co.

[57] ABSTRACT

Apparatus for taking segregated measured samples of liquid and including means for drawing a predetermined volume of the liquid into a closed metering chamber having a valve-controlled outlet, a spout connected to the chamber outlet and movable to discharge liquid successively into a plurality of sample bottles.

14 Claims, 14 Drawing Figures

AUTOMATIC LIQUID SAMPLE TAKING AND SEGREGATING APPARATUS

This invention relates to apparatus for automatically taking samples of liquid with or without solids therein and segregating these samples.

There are prior devices on the market for taking measured samples, but these are rather cumbersome, and measure the samples by time instead of volume, and as the conditions of the liquid usually keeps changing, the timed samples are not all of the same volume. If the sample-taking apparatus is portable and is placed at different heights relative to the liquid, or if the level of the liquid rises or falls, the volume of the samples taken changes. A further disadvantage of the prior devices is that they take each sample relatively slowly, so that if there are solids in the liquid, some separation takes place, making the samples unrepresentative of the liquid being sampled.

Apparatus according to this invention measures the samples by volume so that all samples are of the same volume. This apparatus takes each sample very rapidly so that there is no time for any separation of suspended solids.

The present apparatus takes successive samples at predetermined times and deposits these samples successively in a plurality of bottles. The apparatus can be adjusted so as to direct one or more successive samples in each bottle. This apparatus is relatively small and easily portable, although it includes a relatively large number of large sample bottles, for example 24 bottles. These bottles are so arranged that they take up very little space and so that ice can be kept in contact with each bottle when this is necessary. The apparatus is completely automatic, and has safeguards against malfunctioning.

Apparatus in accordance with this invention for taking and segregating measured-by-volume samples of liquid with or without solids therein, comprises a closed metering chamber, means for drawing a predetermined volume of a liquid being sampled into said chamber, a liquid outlet in the chamber, valve means for closing and opening said outlet, a spout having an inlet end connected to the chamber outlet to receive liquid from the chamber when said valve means opens the outlet and an opposite discharge end, said spout being movably mounted so the discharge end can be moved along a predetermined path, a plurality of sample bottles mounted along said path and each having an entrance opening, and means for indexing the spout to move the discharge end thereof successively into registry with the bottle entrances openings.

An example of the present apparatus is illustrated in the accompanying drawings, in which.

Figure 1:
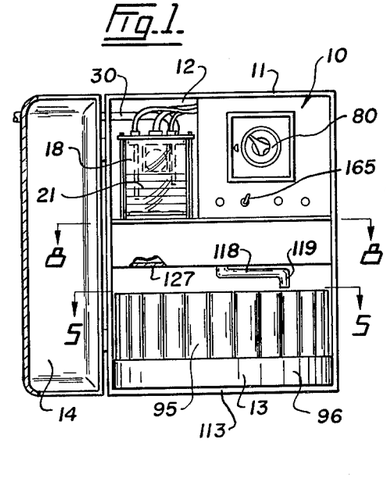
FIG. 1 is a front view of the apparatus with the door of the housing thereof open.

Referring to the drawings, 10 is sample-taking apparatus in accordance with this invention. This apparatus includes a housing 11 having an upper section 12 and a lower section 13. The apparatus is preferably portable, and has a door 14, part of which is shown in FIG. 1 in an open position.

A closed metering chamber 18 is mounted in the upper section of cabinet 11. Although this chamber may be of any desired shape, it is preferably of tubular shape, as shown, and has a cylindrical wall 20 which is preferably formed of transparent material, this wall having graduation marks 21 thereon. These marks indicate different volumes within the chamber, and for example, the volume between any two of these marks may be 100 ccs.

Figure 2:
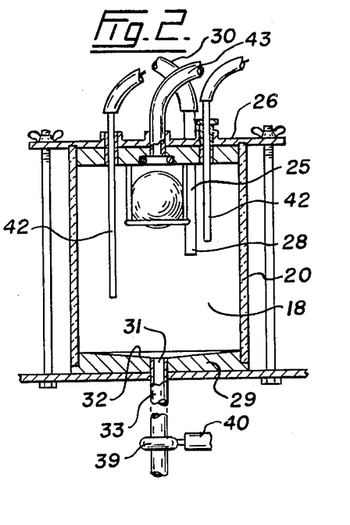
FIG. 2 is an enlarged vertical section through the metering chamber of this apparatus.

Suitable means is provided for adjusting and controlling the volume of liquid drawn into chamber 18 each time this apparatus operates. In FIG. 2, this control means comprises a volume control tube 25 extending through a cover 26 of the chamber and down into said chamber, and this tube is preferably adjustable vertically so that the lower end 28 thereof can be set at different positions relative to the chamber bottom 29. A tube or hose 30 is connected to the outer end of tube 25 and extends out of the cabinet, this hose being long enough to extend into the liquid, not shown, from which samples are to be taken.

Chamber 18 is provided with an outlet opening 31 in the bottom 29 thereof, said bottom preferably being dished towards the outlet, as shown at 32 in FIG. 2. An outlet tube 33 extends downwardly from the metering chamber, and a shut-off valve is provided for controlling the outlet. In this example, the valve is in the form of a pinch valve 39 which can be operated to squeeze and close off tube 33 when desired. Valve 39 is operated in any suitable manner to open and close off outlet tube 33, such as by a solenoid 40.

A level controller is provided in chamber 18 above lower end 28 of control tube 25. In this example, the level controller is in the form of a pair of electrodes 42 that project downwardly from chamber top 26 into the chamber.

Instead of having a tube 25 for controlling the volume of liquid drawn into chamber 18, one of the electrodes 42 can extend down to near the bottom of the chamber, and the other electrode can terminate near the chamber top. In this case, the latter electrode is adjustable vertically relative to the chamber.

Figure 3:
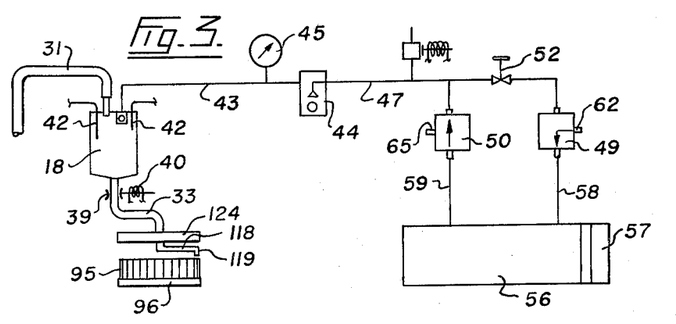
FIGS. 3 and 4 are diagrams of suction-pressure means for the metering chamber.
Figures 4, 10:
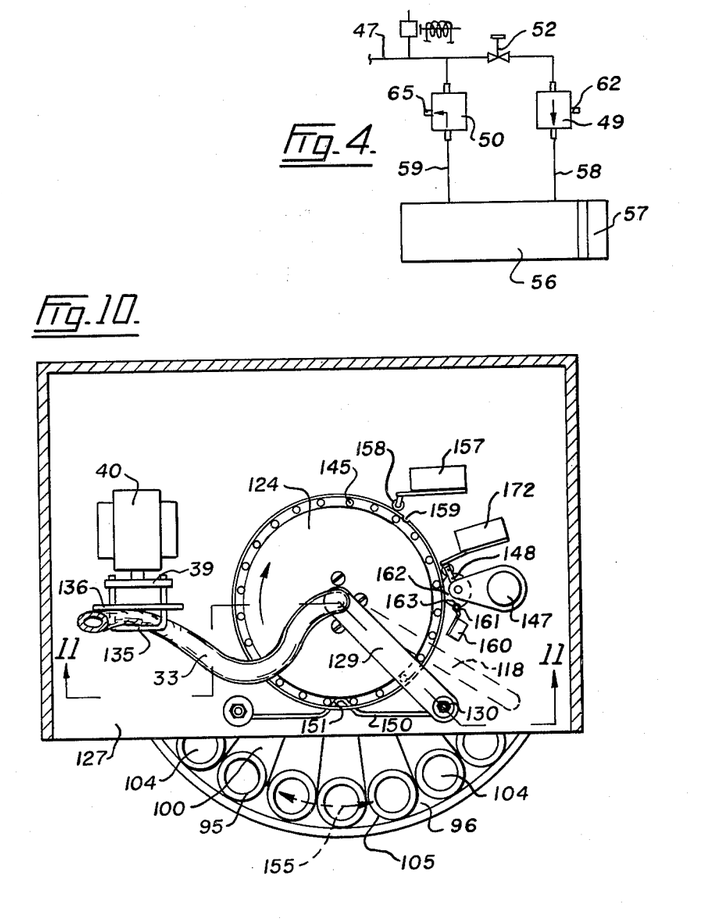
FIG. 10 is an enlarged horizontal section taken on the line 10-10 of FIG. 1.

A vacuum/pressure tube 43 extends from within chamber 18 near the top thereof through top 26 and to a water trap 44, see FIG. 3. If desired, a gauge 45 may be connected to tube 43. Another tube 47 extends from trap 44 to a solenoid vacuum valve 49 and a solenoid pressure valve 50. A suitable control, such as a needle valve 52, is positioned in the portion of pipe 47 extending to valve 49. A suitable vacuum pump 56 is provided, this pump being driven by an electric motor 57. The suction side of pump 56 is connected by pipe 58 to valve 49, while the pressure or outlet side of said pump is connected to valve 50 by a pipe 59. Valve 49 has an inlet 62 which can be selectively brought into communication with pipe 58 by the valve, at which time tube 47 is closed off by said valve, see FIG. 3. Similarly, valve 50 is provided with an outlet 65 which can be selectively brought into communication with pipe 59, at which time pipe 47 is closed off by the valve, as shown in FIG. 4. Pump 56 and valves 49 and 50 constitute a source of positive and negative pressure.

Figure 5:
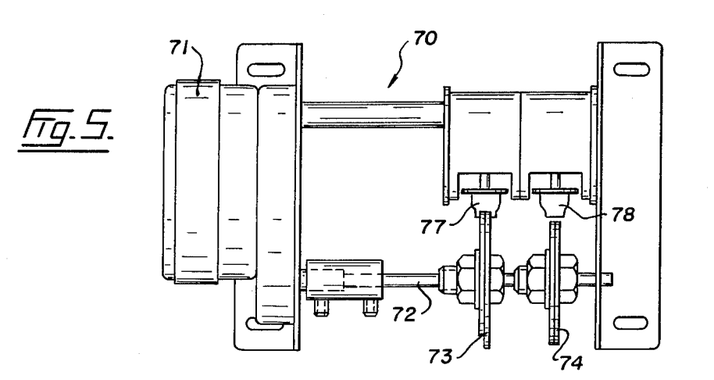
FIG. 5 illustrates an example of a program timer used in this apparatus.
Figure 6:
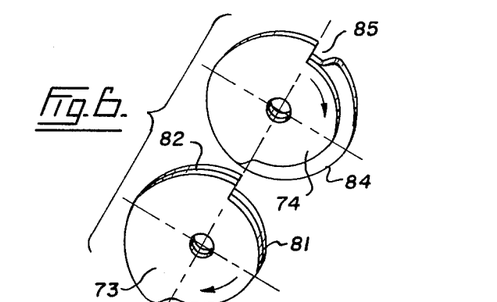
FIG. 6 is an enlarged perspective view of two cams of this program timer.

A programmer or timer is required for apparatus 10, and any suitable device may be used for this purpose. FIGS. 5 and 6 illustrate one form of timer that can be used for this purpose.

A program timer 70 is provided in housing 11 for operating valves 49 and 50 selectively to apply pressure or vacuum to chamber 18. This timer includes an electric motor 71 which drives a shaft 72 upon which cams 73 and 74 are fixedly mounted. Cam 73 is positioned to operate a microswitch 77, while cam 74 operates a microswitch 78.

Figure 13:
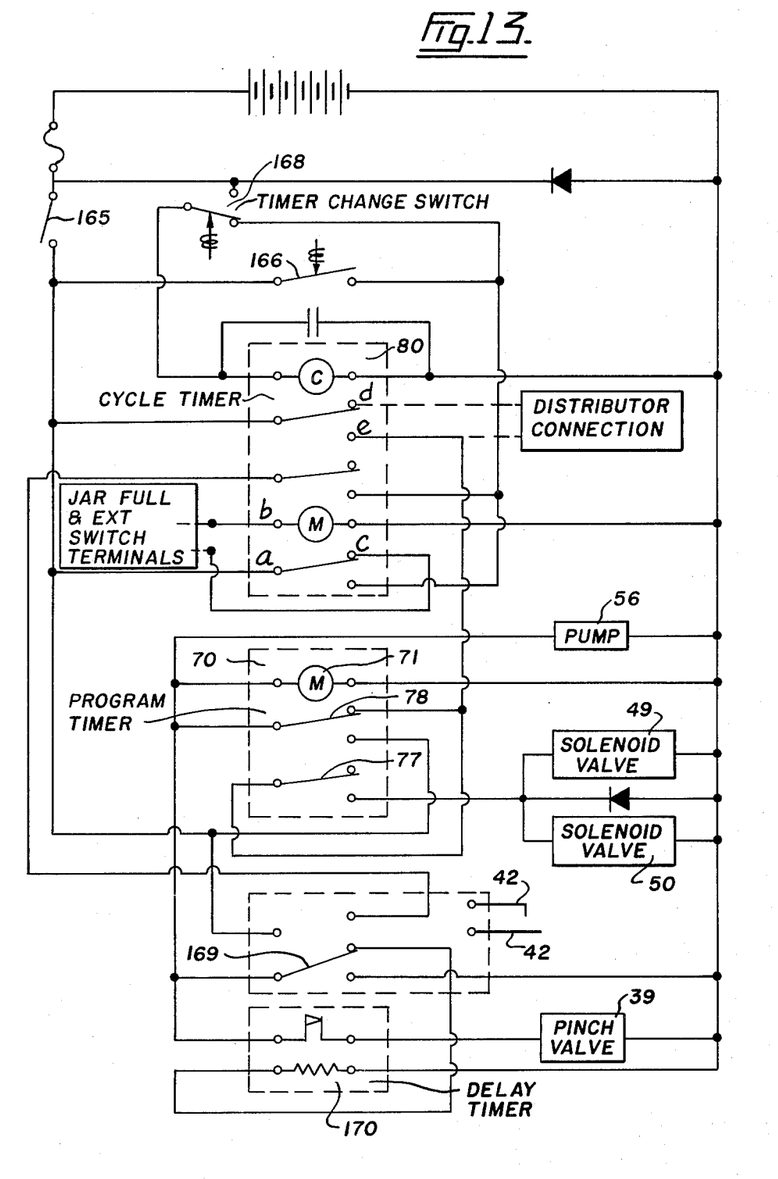
FIG. 13 is a diagram of an example of the main electrical system for this apparatus.
Figure 14:
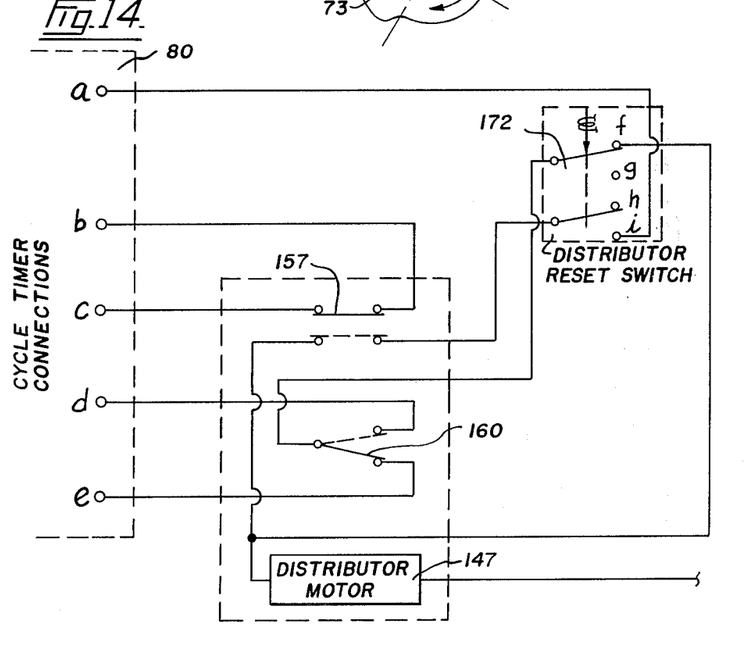
FIG. 14 is a wiring diagram for the distributing section of the apparatus.

The apparatus is provided with a cycle timer 80 which is diagrammatically illustrated in FIGS. 13 and 14. This timer causes apparatus 10 to take samples at predetermined intervals. When timer 80 times out, apparatus 11 is put into operation in order to take a sample, and it will continue to work at taking the sample until the liquid in the metering chamber reaches the electrodes 42, thereby stopping the suction and at the same time causing the timer to be reset.

Cam 73 has two different sections 81 and 82 while cam 74 has a relatively large section 84 and a notch 85 therein, see FIG. 6. The actuator of switch 78 is normally in notch 85 of cam 74. When motor 71 is started by timer 80, cam section 84 moves the switch actuator out of the cam notch, and this switch keeps motor 71 running until said switch actuator drops back into notch 85. However, motor 71 will keep running at this time unless the liquid in the metering chamber has reached electrodes 42.

At the time program motor 71 starts, valves 49 and 50 are in the positions shown in FIG. 3, at which time pump 56 is supplying pressurized air to chamber 18, said air being drawn in through inlet 62 of valve 49. When section 82 of cam 73 operates switch 77, the positions of valves 49 and 50 are reversed, as shown in FIG. 4, at which time pump 56 draws air out of chamber 18 and expels this air through the outlet 65 of valve 50. The time of each suction phase and of each pressure phase depends upon the speed of rotation of shaft 72 and the relative sizes of sections 81 and 82 of cam 73.

Figure 7:
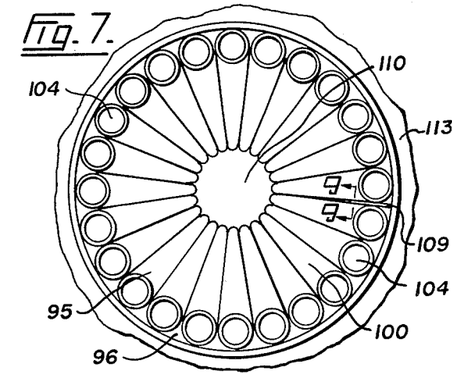
FIG. 7 is a horizontal section taken on the line 7—7 of FIG. 1.
Figure 8:
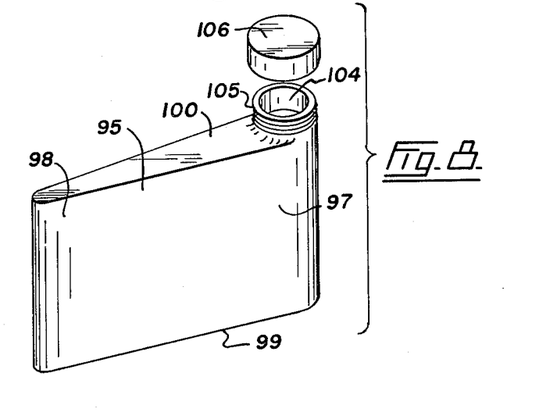
FIG. 8 is an enlarged perspective view of a sample bottle.

A plurality of bottles 95 are mounted in lower section 13 of housing 11 and within a tray 96, see FIGS. 1, 7, and 8, for receiving the liquid discharge from metering chamber 18. Each bottle 95 is substantially wedge-shaped in horizontal cross-section and has a large end 97 and an opposite small end 98. The bottle is relatively long between ends 97 and 98, and relatively high between its bottom 99 and top 100, as clearly shown in FIG. 8. The bottle has a large opening 104 formed in its top 100 at large end 97, and this opening is surrounded by an externally threaded neck 105 for receiving an internally threaded cap 106.

By referring to FIG. 7, it will be seen that the bottles 95 are placed side to side in tray 96 so that they are arranged in a circle within said tray. A rib 109 projects upwardly from the bottom of the tray and fits between two of the bottles in order accurately to locate all of the bottles in the tray, see also FIG. 9. When the bottles are in the tray, caps 106 are removed so that openings 104 are exposed, and these are arranged in a circular path around the tray. The small ends 98 of the bottles terminate short of the center of the tray so that they form a central chamber 110 into which ice can be placed, if it is required. This ice will be in contact with the bottles.

Figure 9:
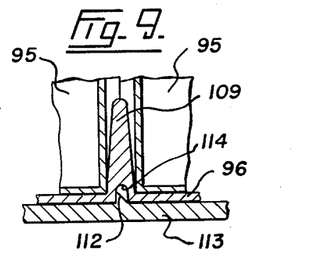
FIG. 9 is a fragmentary sectional view taken on the line 9-9 of FIG. 7.

As it is necessary to have the bottles in exact positions within housing 11, a rib 112 is fixedly mounted on or formed with bottom 113 of the housing, see FIG. 9, and fits into a notch 114 formed in and extending across the bottom of tray 96. When rib 112 fits in notch 114, the tray is properly positioned within the housing, and tray rib 109 properly positions the bottles within the tray.

Figure 11:
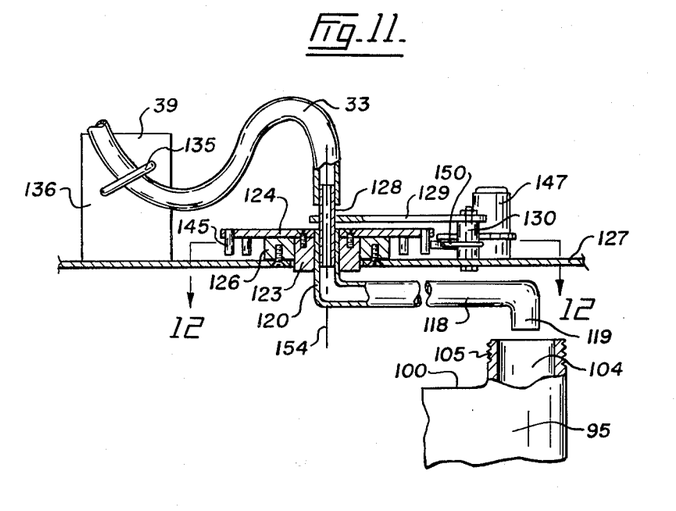
FIG. 11 is an enlarged sectional view through the spout-moving mechanism.
Figure 12:
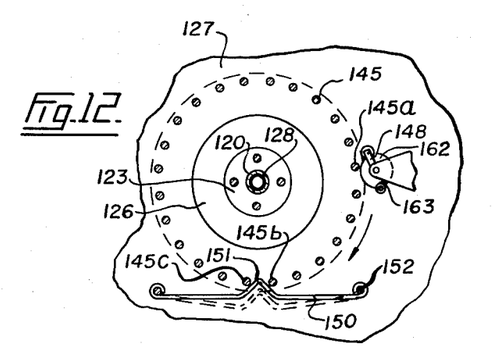
FIG. 12 is a horizontal section taken on the line 12—12 of FIG. 11.

Referring to FIGS. 10 to 12 liquid is directed in succession into bottles 95 by a spout 118. This spout extends generally horizontally, as shown in FIG. 11, and has a downwardly extending discharge end 119 which is aligned with the circular path in which the entrance openings 104 of the bottles are aligned. Spout 118 also has an upwardly extending inner end 120 which is fixedly secured to a hub 123 of a distributor or indexing disc 124. Hub 123 rotatably fits in a bearing block 126 which is mounted on and secured to a horizontal support 127 that extends across the top of the lower section 13 of housing 11. The spout inner end 120 opens out through the top of disc 124 and slidably fits around a stationary pipe 128 which is fixedly secured to and supported by an arm 129 extending radially above disc 124 and beyond the peripheral edge thereof where it is mounted on a post 130 secured to and extending upwardly from support 127. Tube 33, which is preferably flexible, extends down to and fits over the upper end of pipe 128 to which it is secured.

Pinch valve 39 is in the form of a loop 135 which slidably extends through a support block 136 mounted on support 127, said loop being controlled by solenoid 40. The valve loop 135 is drawn towards block 136 to pinch or close-off tube 33, and is moved outwardly relative to the block to open the tube to allow liquid to flow therethrough.

An example of a suitable mechanism for indexing or moving disc 124 is shown in FIGS. 10 to 12. Disc 124 has a plurality of pins 145 projecting downwardly therefrom and arranged in a circle near the periphery thereof. A motor unit 147 is mounted on support 127 near the edge of the distributor disc, and carries an arm 148. This arm is mounted to rotate in a plane just below disc 124 and so as to engage one of the pins 145 each time the arm makes one revolution. The motor unit includes an electric motor (not shown) which is operatively connected to arm 148 and includes a brake (not shown) to stop the arm in the position shown in FIG. 12 out of the path of pins 145. As this motor unit is well known and can be purchased in the market, it does not need detailed description or illustration herein. It is sufficient to say that arm 148 makes one complete revolution each time the motor unit is energized. The arm is shown as being rotatably mounted at one end, but it can be made longer and mounted in the center so that each of its opposite ends engages one of the pins 145 during each revolution. In this case, the arm would make a half revolution each time the motor unit is energized.

It is to be understood that other mechanisms, such as a stepping relay or motor, can be used in place of motor unit 147 and its associated elements.

In order to hold the disc and, consequently, spout 118 in an exact position after each movement of the disc, a light spring 150 having a V-section 151 is mounted on support 127 at one end 152 of the spring. This spring is positioned adjacent the disc so that the V-section 151 thereof normally projects into the space between two pins 145 and engages both of these pins to hold the disc stationary. When arm 148 engages and moves a pin 145a to rotate disc 124, pin 145b also moves and depresses spring 150 so that the latter pin moves into the position 145c.

Each time motor unit 147 is energized, arm 148 engages one of the pins 145 and rotates disc 124 a distance equal to the distance between the vertical centers of two adjacent pins. This action moves spout 118, which is connected to disc 124, to shift the outer or discharge end 119 thereof from above the inlet opening 104 of one bottle 95 to a position over the inlet of the next adjacent bottle. Spring 150 acting on two of the disc pins retains the spout in its new position until motor unit 147 is energized again. Spout 118 rotates around a vertical axis 154 which is co-incident with the centre of disc 124 and of a circular path 155 along which the bottle openings 104 of the bottles are positioned.

A micro switch 157 is mounted on support 127 near disc 124 and has a roller actuator 158 which normally rides on the peripheral edge of the disc, see FIG. 10, but said actuator drops into a notch 159 in the disc edge when the last bottle is being filled. When this takes place, the apparatus is cut off from the electrical power until it is normally reset. A motor advance switch 160 is mounted near motor unit 147 and has an actuator 161 which rides on the edge of a cam 162 fixedly mounted on the same shaft as arm 148. This cam has a notch 163 in the edge thereof in which actuator 161 normally fits.

FIG. 13 is a wiring diagram of an electrical system for apparatus 10. This electrical system includes cycle timer 80, program timer 70, pump 56, valves 49 and 50, and pinch valve 39. The circuitry also includes a main on-off switch 165, a switch 166 for manually starting the apparatus to take a sample, and a timer change switch 168. Also included are a pulse activated relay 169 and a delay timer 170.

FIG. 14 is a wiring diagram for the distributor arrangement of this apparatus. The circuitry of this Figure includes a distributor reset switch 172, distributor motor 147 and switch 157.

Referring to FIG. 13, when apparatus 11 is in operation, cycle timer 80 runs until it times out, at which time the motor of this timer stops and the clutch thereof disengages. The switches of the cycle timer are operated so that power is delivered to start motor 71 of program timer 70, to start pump 56, and to close pinch valve 39. Solenoid valves 49 and 50 are set at this time so as to direct air under pressure to metering chamber 18. After a predetermined period, for example 15 seconds, cam 73 of the program timer reverses valves 49 and 50 to apply vacuum to the metering chamber. When the liquid in the chamber contacts electrodes 42, relay 169 is activated to cause the clutch of timer 80 to engage and to return valves 49 and 50 to the position of applying pressure to the metering chamber. At the same time, power is delivered to the coil of delay timer 170, and after a predetermined period, for example 2 seconds, the delay timer switch is opened to cut power off from pinch valve 39 so that the latter opens. At the same time, cam 74 causes switch 78 to cut the power off from program timer 70.

Timer change switch 168, which is normally closed, and with switch 165 open, is manually opened when it is desired to reset the cycle timer to a different timing.

Referring to FIG. 14, switch 160 is operated by cam 162 on the power shaft of distributor motor 147. When the actuator of switch 160 is in cam notch 163, the switch is in the dotted line position shown in FIG. 14, and when the actuator is out of the notch, the switch position is changed to that shown in full lines.

When the actuator of switch 157 bears against the edge of distributor disc 124, the switch is in the full line position shown in FIG. 14, but when the actuator is in notch 159, switch 157 is in the position shown in broken lines.

In order to set up the distributing apparatus after a set of empty bottles 95 has been inserted in apparatus 11, reset switch 172 is depressed, to direct power through switch 157 to start distributor motor 147. This immediately moves actuator 158 of switch 157 out of disc switch 159 to cut off the power to motor 147, thus stopping movement of disc 124. During this time actuator 161 of switch 160 is moved out of cam switch 163 on to the edge of cam 162. The apparatus is now set up for operation when timer 80 times out.

The main on-off switch 165 is closed when the apparatus is in use. When timer 80 times out, power travels through switch 160 and switch 172 to start motor 147 to cause it to rotate arm 148 to move disc 124 and shift spout 110 to the next bottle. When actuator 161 drops into cam switch 163, switch 160 is operated to cut off power to the motor. At the same time, timer 80 is reset and this causes power to travel through switch 160 to energize motor 147, causing switch actuator to be shifted out of the cam notch on to the cam edge, at which time switch 160 is operated to de-energize the motor, leaving the actuator on the cam edge ready for the next sample taking operation. When the last bottle of the group is filled, actuator 158 of switch 157 drops into notch 159 and terminates the sample operation.

The liquid sample 10 generally operates in the following manner:

When a signal is received from a timer which forms part of this apparatus, or from an outside source, such as a flow meter, pump 56 is started and valves 48 and 50 are set as shown in FIG. 3 so that air under pressure is directed into metering chamber 18 and out through pipe 31 to purge the latter of any liquid or materials remaining therein from the last sample taking operation. After a predetermined time, for example 5 seconds, valves 49 and 50 are reversed to the positions shown in FIG. 4, at which time a vacuum is applied to the metering chamber to suck liquid very rapidly through tube 30 into the chamber. When the liquid reaches electrodes 42, valves 49 and 50 are again reversed so that pressure air is directed into the chamber rapidly to discharge liquid out of the chamber until it reaches the lower end of tube 25, leaving a predetermined volume of the liquid in the chamber. Then pinch valve 39 is opened, and the pressure air forces liquid through tube 33 and spout 98 into the bottle 75 positioned beneath spout end 99. If one sample only is to be directed into each bottle, motor unit 147 now rotates arm 128 through one revolution which rotates the spout end to a position over the next adjacent bottle. Then pump 56 is stopped, and pinch valve is closed so that the apparatus is ready for the next sample taking operation.

If it is desired to direct more than one sample into each bottle, for example 3, then a counter is operated each time the metering chamber is filled and the liquid contacts electrodes 42. In this case, the motor unit 147 is energized only after three samples have been taken. This counter can also be arranged to cut off the apparatus after sufficient samples have been taken for all of the bottles.

I claim:

1. Apparatus for taking and segregating measured samples of liquid with or without solids therein, comprising a closed metering chamber, a volume control tube extending down into the chamber and having a lower end positioned above the bottom of the chamber, an inlet tube connected to the control tube for directing fluid into the chamber through said control tube, a liquid outlet tube opening into the chamber at the bottom thereof, valve means for closing and opening said outlet tube, means for selectively operating said valve means to open and close the outlet tube, a source a positive and negative pressure operatively connected to the chamber near the top thereof, control means for causing said source selectively to apply pressure and suction to the chamber, a liquid level controller for the chamber and connected to said source control means to operate said source to shut off the suction and to start the pressure when the liquid sample in the chamber reaches a predetermined level above the lower end of the control tube, said suction drawing liquid samples through the control tube into the chamber when the outlet tube is closed until stopped by the level controller and said pressure blowing liquid out through the control tube until the liquid reaches the lower end thereof and while the outlet tube is closed and out through said outlet tube when the outlet tube is open, a plurality of sample bottles mounted along a path and each having an entrance opening, and liquid distributing means connected to the outlet tube for receiving said expelled samples and mounted for movement along said path to successively direct the samples into the bottles.

2. Apparatus as claimed in claim 1 in which said valve means comprises a pinch valve operable to squeeze and release said outlet tubes respectively to close and open the outlet tube.

3. Apparatus as claimed in claim 1 in which said liquid distributing means comprises a spout having an inlet end connected to the outlet tube to receive the expelled liquid from the chamber when said valve means opens the outlet tube and an opposite discharge end, said spout being movably mounted so that the discharge end thereof can be moved along said path, and means for indexing the spout to move the discharge end thereof successively into registry with the bottle entrance openings.

4. Apparatus for taking and segregating measured samples of liquid with or without solids therein, comprising a closed metering chamber, means for drawing a sample of a predetermined volume of a liquid being sampled into said chamber, a liquid outlet tube opening into the chamber near the bottom thereof, valve means for closing and opening said outlet tube, pressure means for expelling the liquid through the outlet tube when the latter is open, a spout having an inlet end connected to the chamber outlet tube to receive the expelled liquid from the chamber when said valve means opens the outlet tube and an opposite discharge end, said spout being movably mounted so that the discharge end thereof can be moved along a predetermined path, a plurality of sample bottles mounted along said path and each having an entrance opening, each sample bottle being substantially wedge-shaped in horizontal section and having an inner small end and an outer large end, and means for indexing the spout to move the discharge end thereof successively into registry with the bottle entrance openings.

5. Apparatus as claimed in claim 4 in which said path is circular, and said spout is mounted to rotate around a vertical axis coincident with the centre around which said path extends.

6. Apparatus as claimed in claim 4 in which the inner ends of the bottles are positioned to form a space surrounded by the bottles and in which ice can be placed in contact with the bottles.

7. Apparatus as claimed in claim 4 in which the entrance opening of each bottle is located in the top of the bottle at the large outer end thereof.

8. Apparatus as claimed in claim 4 in which said indexing means comprises a movably mounted plate connected to the inlet end of the spout and mounted to move the the latter, a plurality of pins on the plate and arranged in a path corresponding in shape to the path of movement of the spout, a rotatably mounted arm positioned so that each time the arm is rotated, a portion of the arm moves into and out of engagement with one of said pins to move said one pin and said plate a predetermined distance, and means for rotating said arm to cause the plate to move the predetermined distance after a predetermined volume of liquid has been directed into each bottle.

9. Apparatus as claimed in claim 8 including means normally retaining said plate in a stationary position.

10. Apparatus for taking and segregating measured samples of liquid with or without solids therein, comprising a closed metering chamber, vacuum means for drawing a predetermined volume of a liquid being sampled into said chamber, a liquid outlet in the chamber, valve means for closing and opening said outlet, means for applying pressure to the chamber to expel the liquid through the outlet when the latter is open, means for selectively operating said valve means to open and close said outlet and operable to open the outlet when pressure is applied to the chamber after the predetermined volume of liquid has been drawn thereinto, a supporting tray, a plurality of bottles mounted in a circle around a centre on said tray, each sample bottle being substantially wedge-shaped in horizontal section and having an inner small end and an outer large end, each bottle having an entrance opening in the top thereof, a spout above the bottles and having an inlet end at said centre and a discharge end above said bottle openings, said spout being movably mounted so said discharge end can be moved over the bottle entrance openings, a tube connecting the inlet end of the spout to the outlet to the chamber, and means for indexing the spout to move the discharge end thereof successively into registry with the bottle entrance openings.

11. Apparatus as claimed in claim 10 in which the inner ends of the bottles are positioned to form a space surrounded by the bottles and in which ice can be placed in contact with the bottles.

12. Apparatus as claimed in claim 10 in which the entrance opening of each bottle is located in the top of the bottle at the large outer end thereof.

13. Apparatus as claimed in claim 10 in which said indexing means comprises a rotatably mounted plate connected to the inlet end of the spout and mounted to rotate the latter, a plurality of pins on the plate and arranged in a circle around said inlet of the spout, a rotatably mounted arm positioned so that each time the arm is rotated, a portion of the arm moves into and out of engagement with one of said pins to move said one pin and said plate a predetermined distance, and means for rotating said arm to cause the plate to move the predetermined distance after a predetermined volume of liquid has been directed into each bottle.

14. Apparatus as claimed in claim 13 including means normally retaining said plate in a stationary position.

* * * * *